(No Model.)
T. A. & J. H. MURPHY.
MEANS FOR OPERATING BLOWERS.
No. 464,638. Patented Dec. 8, 1891.
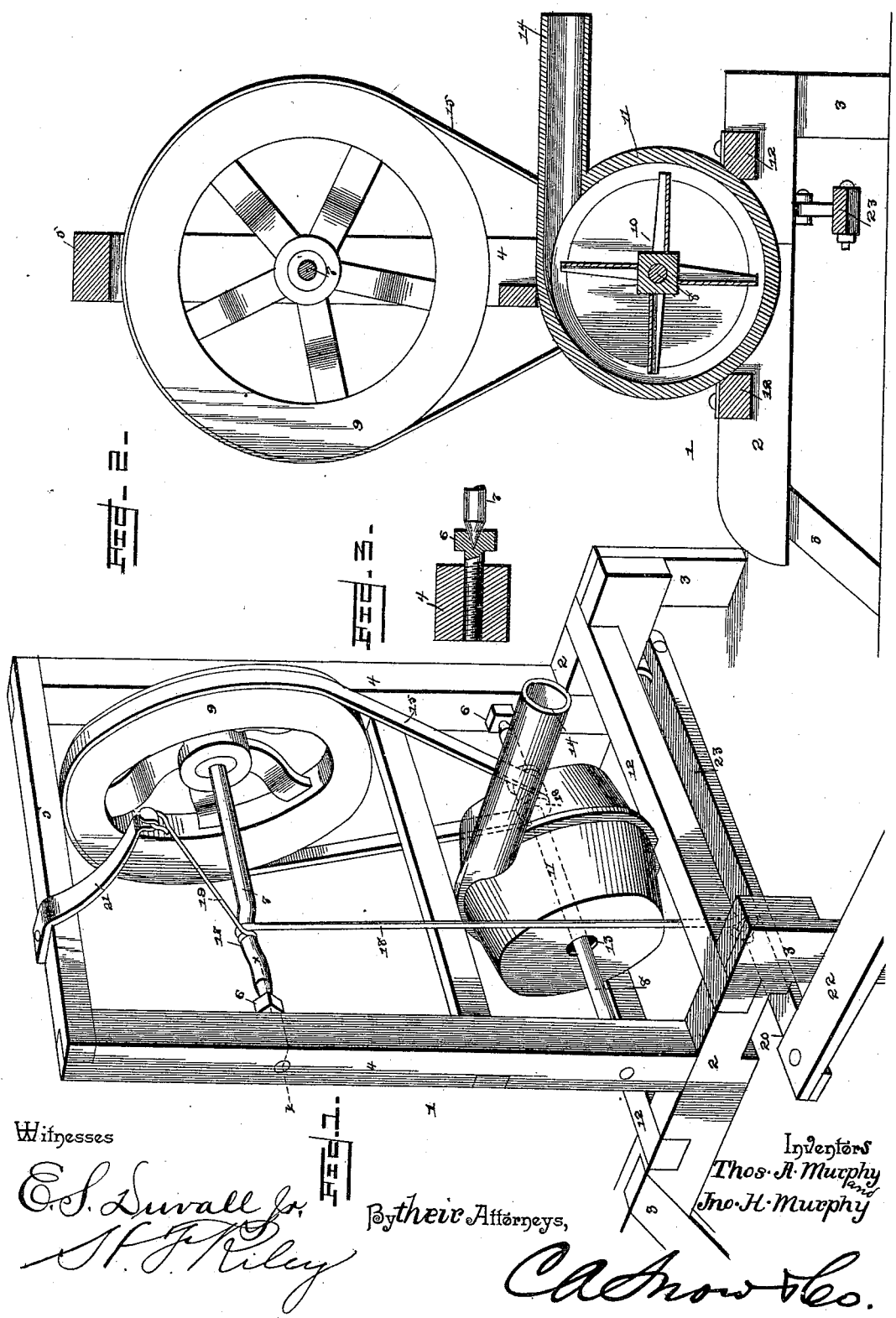
Witnesses
E. S. Duvall Jr.
N. J. Riley
By their Attorneys,
Inventors
Thos. A. Murphy
Jno. H. Murphy
C. A. Snow & Co.

UNITED STATES PATENT OFFICE.

THOMAS A. MURPHY AND JOHN H. MURPHY, OF KERENS, TEXAS, ASSIGNORS OF ONE-THIRD TO J. Y. CARROLL, OF SAME PLACE.

MEANS FOR OPERATING BLOWERS.

SPECIFICATION forming part of Letters Patent No. 464,638, dated December 8, 1891.

Application filed June 6, 1891. Serial No. 395,353. (No model.)

*To all whom it may concern:*

Be it known that we, THOMAS A. MURPHY and JOHN H. MURPHY, citizens of the United States, residing at Kerens, in the county of Navarro and State of Texas, have invented a new and useful Means for Operating Blowers, of which the following is a specification.

The invention relates to improvements in means for operating blowers for forges and the like.

The object of the present invention is to simplify and improve the construction of blowers and to enable a forge-blower to be readily operated by the foot, to leave the hands of the operator free.

The invention consists in the construction and novel combination and arrangement of parts hereinafter fully described, illustrated in the accompanying drawings, and pointed out in the appended claim.

In the drawings, Figure 1 is a perspective view of a blower constructed in accordance with this invention. Fig. 2 is a vertical sectional view. Fig. 3 is a detail view of the cone-bearing.

Referring to the accompanying drawings, 1 designates a frame consisting of longitudinal sills 2, posts 3, secured to the ends of the sills and supporting the same, vertical uprights 4, rising from the middle of the sills, and a cross-bar 5, connecting the tops of the uprights. The uprights are provided near their ends with adjustable cone-bearings 6, which receive the conical ends of a drive-shaft 7 and a fan-shaft 8, the former of which carries a drive-wheel 9 and the latter carries a fan 10. The fan is arranged in the casing 11, which is mounted on cross-bars 12, and which is provided with supply-openings 13 around the shaft 8, and has a discharge-pipe 14, designed to be connected with a forge or the like, the drive-wheel communicating motion to the fan-shaft by a belt 15, which is arranged on the drive-wheel and a sheave or pulley 16, and the drive-shaft is provided with a crank-bend 17, which is grooved annularly and receives the eyes of rods 18 and 19, which extend upward and downward from the shaft and are connected, respectively, to a treadle or foot-lever 20 and a spring 21. The treadle or foot-lever is L-shaped and has its ends pivotally mounted, and the lower end of the rod 18 is connected to the treadle or foot-lever near the angle thereof. The spring is secured to the top cross-bar 5 and extends downward and outward therefrom, and is provided at its outer end with a hook, which receives an eye of the upper end of the rod 19, and the spring is adapted to hold the treadle or foot-lever raised and in position to be operated by a downward pressure of the foot.

It will be seen that the blower is simple and inexpensive in construction and is adapted to be operated by the foot, to leave the hands of the operator free.

The foot-lever or treadle consists of bars 22 and 23, which are arranged at right angles and have their adjacent ends secured together. The other end of the bar 23 is bifurcated and pivoted to a plate depending from one of the sills 2, and the outer end of the bar 22 is pivoted to a suitable post or support.

The blower is easily operated and is always in position to be operated by the foot of a blacksmith or other person, and the arrangement of the spring is especially advantageous, as it carries the crank-loop past the dead-center and holds it away from the same and prevents the blower stopping with the crank-loop over the dead-center. This spring acts in conjunction with the drive-wheel in carrying the crank-loop past the dead-center and enables the blower to be operated successfully with the drive-wheel of less weight than could be employed were the spring otherwise arranged.

What we claim is—

The combination of a frame, a drive-shaft provided with a crank-bend, the fan-shaft journaled in suitable bearings and connected with the drive-shaft, the foot-lever pivotally mounted, the rod connecting the foot-lever with the crank-bend, the spring secured to the top of the frame and inclining downwardly therefrom and terminating at one side of the crank-bend and provided at its lower end with a hook, and the rod 19, connected to the crank-loop and provided at its upper end with an eye to engage the said hook and inclining upward laterally from the crank-loop, whereby the latter is held away from the dead-center, substantially as described.

In testimony that we claim the foregoing as our own we have hereto affixed our signatures in presence of two witnesses.

THOMAS A. MURPHY.
JOHN H. MURPHY.

Witnesses:
G. R. WASHBURN,
J. Y. CARROLL.